United States Patent [19]
Kawajiri et al.

[11] Patent Number: 5,483,802
[45] Date of Patent: Jan. 16, 1996

[54] VUILLEUMIER HEAT PUMP

[75] Inventors: Kazuhiko Kawajiri, Hyogo; Takuya Suganami, Gifu; Tetsuya Honda, Hyogo; Teruo Sugimoto, Hyogo; Michio Fujiwara, Hyogo, all of Japan

[73] Assignee: Mitsubishi Denki Kabushiki Kaisha, Tokyo, Japan

[21] Appl. No.: 238,783

[22] Filed: May 6, 1994

Related U.S. Application Data

[63] Continuation of Ser. No. 73,318, Jun. 8, 1993, abandoned.

[51] Int. Cl.$^6$ ..................................................... F25B 9/00
[52] U.S. Cl. ..................................................... 62/6; 60/520
[58] Field of Search ..................................... 62/6; 60/520

[56] References Cited

U.S. PATENT DOCUMENTS

| | | | |
|---|---|---|---|
| 1,553,546 | 9/1925 | Lundgaard | 62/6 |
| 3,630,041 | 12/1971 | Daniels et al. | 62/6 |
| 3,774,405 | 11/1973 | Leo | 62/6 |
| 3,877,239 | 4/1975 | Leo | 62/6 |
| 3,913,339 | 10/1975 | Berry | 62/6 |
| 3,991,585 | 11/1976 | Mulder | 62/6 |
| 4,024,727 | 5/1977 | Berry et al. | 62/6 |
| 4,158,293 | 6/1979 | Chellis | 62/6 |
| 4,397,155 | 8/1983 | Davey | 62/6 |
| 4,475,346 | 10/1984 | Young et al. | 62/6 |
| 4,498,296 | 2/1985 | Dijkstra et al. | 60/520 X |
| 4,578,956 | 4/1986 | Young | 62/6 |
| 4,683,723 | 8/1987 | Doi et al. | 62/6 |
| 4,717,405 | 1/1988 | Budliger | 62/6 |
| 4,862,695 | 9/1989 | Kushnir | 62/6 |
| 4,922,722 | 5/1990 | Kazumoto et al. | 62/6 |

FOREIGN PATENT DOCUMENTS

| | | |
|---|---|---|
| 0267144 | 5/1988 | European Pat. Off. . |
| 3423365 | 1/1986 | Germany . |
| 5-626 | 1/1993 | Japan . |
| 2206402 | 1/1989 | United Kingdom . |
| 2258349 | 2/1993 | United Kingdom . |
| 2258523 | 2/1993 | United Kingdom . |

OTHER PUBLICATIONS

S. Schulz et al., "Development of a Free Piston Vuilleumier Machine for Cooling Purposes", *International Stirling Engine Conference (ISEC–91060)*, May 8–10, 1991, pp. 15–20.

H. Carlsen et al., "Stimulation Model for the Design of Vuilleumier Machines", *Advances in Heat–Pumps—1989*, published by The Technical University of Denmark for the Winter Annual Meeting of The American Society of Mechanical Engineers, AES–vol. 7, Dec. 10–15, 1989, pp. 39–46.

*Primary Examiner*—Christopher Kilner
*Attorney, Agent, or Firm*—Burns, Doane, Swecker & Mathis

[57] ABSTRACT

In a Vuilleumier heat pump, hot and cold displacers are supported by coil springs in respective buffer chambers. Further, there are respectively provided forced vibration systems of the hot and cold displacers using, as exciting force, force applied to respective displacer rods due to a difference between a pressure fluctuation of a working gas in an inner working space and a pressure in the buffer chambers. A linear motor is also provided to drive the hot displacer so as to reciprocate. It is thereby possible to provide the Vuilleumier heat pump in which a mechanism for driving the hot and cold displacers can have a small-sized and simplified structure, and no restriction is imposed on an arrangement of hot and cold cylinders.

4 Claims, 11 Drawing Sheets

PHASE DIFFERENCE Φ=90°

CRANK ANGLE

PRESSURE P

HOT SPACE VOLUME V

PRESSURE P

COLD SPACE VOLUME V

PRESSURE P

HOT/MODERATE TEMPERATURE SPACE VOLUME V

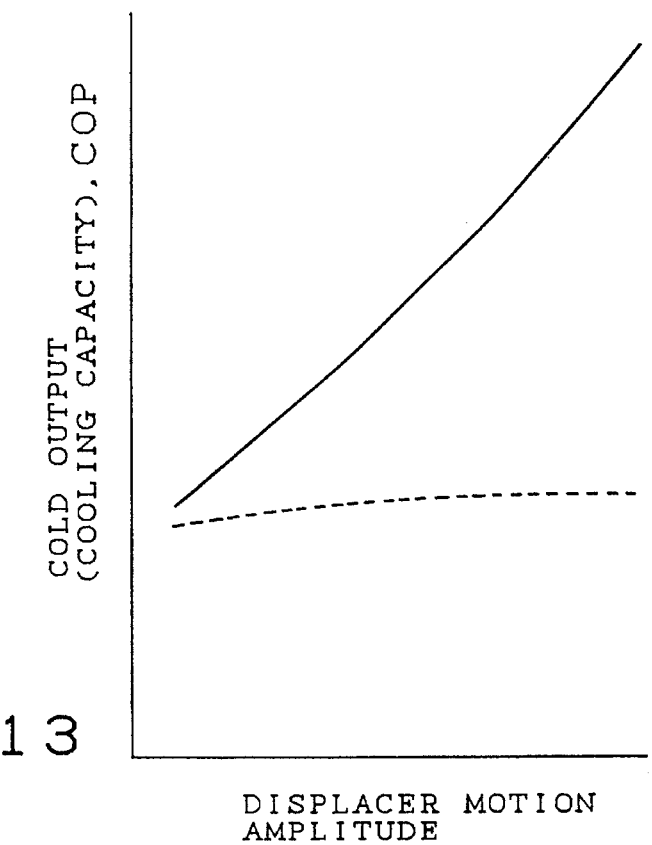
F I G. 1 3
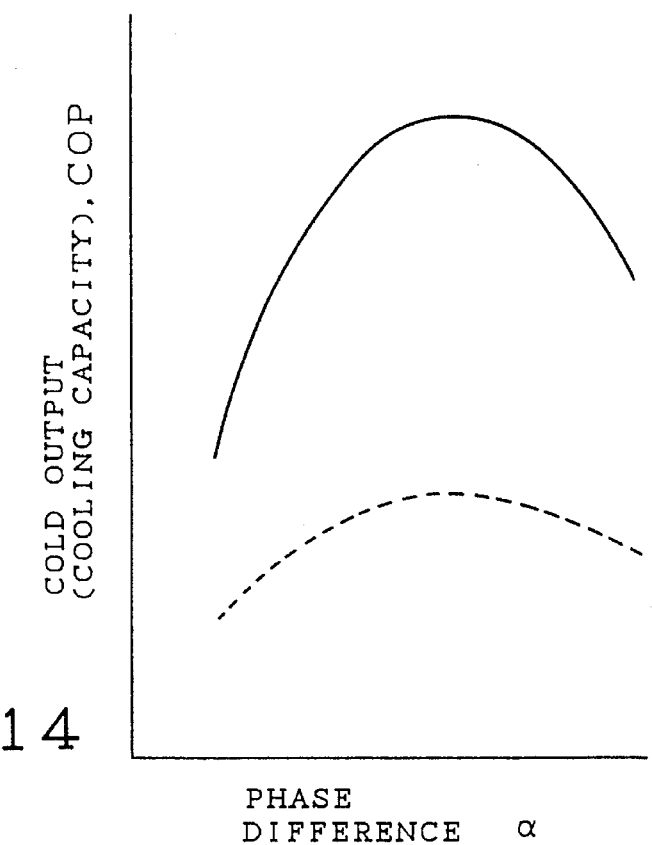
F I G. 1 4

CRANK ANGLE

VUILLEUMIER HEAT PUMP

This application is a continuation of application Ser. No. 08/073,318, filed Jun. 8, 1993, now abandoned.

BACKGROUND OF THE INVENTION

1. Field of the Invention

The present invention relates to a Vuilleumier heat pump for use in air conditioning for refrigeration or heating and cooling.

2. Description of the Prior Art

FIG. 1 is a sectional view showing an arrangement of a conventional Vuilleumier heat pump which is disclosed in, for example, an article by H. Carlsen and N. E. Andersen entitled 'Simulation Model for the Design of Vuilleumier Machines' in *Advances in Heat Pumps:* ASME Winter Annual Meeting (1989), pp. 39–46. In FIG. 1, reference numeral 1 means a hot cylinder, 2 means a hot displacer reciprocating inside the hot cylinder 1, 3 is a hot displacer rod coupled with the hot displacer 2, 4 is a hot displacer connecting rod coupled with the hot displacer rod 3, and 5 is a hot crank coupled with the hot displacer connecting rod 4. Further, reference numeral 6 means a cold cylinder, 7 is a cold displacer reciprocating inside the cold cylinder 6, 8 is a cold displacer rod coupled with the cold displacer 7, 9 is a cold displacer connecting rod coupled with the cold displacer rod 8, and 10 is a cold crank coupled with the cold displacer connecting rod 9. Reference numeral 11 means a coupling shaft for coupling the hot crank 5 with the cold crank 10 so as to enable motion of the hot displacer 2 and the cold displacer 7 with a phase difference of substantially a right angle therebetween.

Reference numeral 12 means a hot space which is defined between the hot cylinder 1 and an upper portion of the hot displacer 2, and 13 means a hot/moderate temperature space which is defined between the hot cylinder 1 and a lower portion of the hot displacer 2. Further, reference numeral 14 is a heater coupled with the hot space 12, 15 means a hot regenerator coupled with the heater 14, 16 is hot/moderate temperature heat exchanger for coupling the hot regenerator 15 with the hot/moderate temperature space 13, 17 is a cold space which is defined between the cold cylinder 6 and an upper portion of the cold displacer 7, and 18 is a cold/moderate temperature space which is defined between the cold cylinder 6 and a lower portion of the cold displacer 7. Reference numeral 19 means a cold heat exchanger coupled with the cold space 17, 20 means a cold regenerator coupled with the cold heat exchanger 19, 21 is a cold/moderate temperature heat exchanger for coupling the cold regenerator 20 with the cold/moderate temperature space 18, and 22 is a coupling pipe for communicating between the hot/moderate temperature space 13 and the cold/moderate temperature space 18. A working space is defined by the heater 14, the hot regenerator 15, the hot/moderate temperature heat exchanger 16, the cold heat exchanger 19, the cold regenerator 20, the cold/moderate temperature heat exchanger 21, an inside of the coupling pipe 22, the hot space 12, the hot/moderate temperature space 13, the cold space 17, the cold/moderate temperature space 18. A working gas such as helium is sealed in the working space.

Reference numeral 23 means a crank case involving the hot displacer connecting rod 4, the hot crank 5, the cold displacer connecting rod 9, the cold crank 10, and the coupling shaft 11. Reference numeral 24 means a buffer chamber in the crank case 23, and the hot displacer rod 3 and the cold displacer rod 8 move in and out of the buffer chamber 24. Reference numeral 25 means a hot displacer seal which is mounted on the hot displacer 2 so as not to directly mix the working gas in the hot space 12 with that in the hot/moderate temperature space 13. Reference numeral 26 means a hot displacer rod seal which prevents the working gas from leaking from the hot/moderate temperature space 13 to the buffer chamber 24. Reference numeral 27 means a cold displacer seal which is mounted on the cold displacer 7 so as not to directly mix the working gas in the cold space 17 with that in the cold/moderate temperature space 18. Reference numeral 28 means a cold displacer rod seal which prevents the working gas from leaking from the cold/moderate temperature space 18 to the buffer chamber 24.

A description will now be given of the operation.

When clockwise rotating the hot crank 5 and the cold crank 10 which are coupled with each other through the coupling shaft 11, the hot displacer 2 reciprocates in the hot cylinder 1, and the cold displacer 7 reciprocates in the cold cylinder 6. Further, the cold displacer 7 reciprocates with a delay of about a right angle.

The heater 14 is heated up typically between 400° and 800° C. by, for example, a burner (not shown), and on the other hand, the hot/moderate temperature heat exchanger 16 is cooled to a vicinity of room temperature by cooling water or the like. The reciprocation of the hot displacer 2 causes the internal working gas to alternate between the hot space 12 and the hot/moderate temperature space 13 by passing through the heater 14, the hot regenerator 15, and the hot/moderate temperature heat exchanger 16. At this time, a pressure fluctuation of the gas is generated in the working space due to variation of occupied ratio of the hot working gas and the moderate temperature working gas. FIG. 2 is a waveform diagram showing the reciprocation of the hot displacer 2 and the pressure fluctuation of the internal working gas in one cycle. The reciprocation of the cold displacer 7 is also shown in FIG. 2. In FIG. 2, the reciprocation of the hot displacer 2 is shown by the solid wavy line, the pressure fluctuation of the internal working gas is shown by the broken wavy line, and the reciprocation of the cold displacer 7 is shown by the one dot chain wavy line. The pressure fluctuation is transmitted to the working gas in the cold cylinder 6 through the coupling pipe 22. In this case, FIG. 3 shows a P-V diagram described in the hot space 12, FIG. 4 is a P-V diagram described in the cold space 17, FIG. 5 is a P-V diagram described in the hot/moderate temperature space 13, and FIG. 6 is a P-V diagram described in the cold/moderate temperature space 18. As understood from the above description, expansion work is generated in the hot space 12 and the cold space 17, and compression work is generated in the cold/moderate temperature space 18 and the hot/moderate temperature space 13.

The expansion work generated in the cold space 17 is drawn as cold from the cold heat exchanger 19, and the cold is used for cooling. The compression work generated in the cold/moderate temperature space 18 and the hot/moderate temperature space 13 is drawn as hot from the cold/moderate temperature heat exchanger 21 and the hot/moderate temperature heat exchanger 16, and the hot is used for heating.

The Vuilleumier heat pump is started by an electric motor (not shown) coupled with the hot crank 5 or the cold crank 10. The hot displacer rod 3 and the cold displacer rod 8 reciprocate with the phase difference of about a right angle as in the case of the hot displacer 2 and the cold displacer 7. Accordingly, the volume of the working space is varied so that the pressure fluctuation generated in the working space causes external work. Consequently, the work causes the Vuilleumier heat pump to be self-sustaining and operated at a working frequency balancing with sliding friction of the hot displacer seal 25, the hot displacer rod seal 26, the cold displacer seal 27, the cold displacer rod seal 28, or friction of each bearing slider.

The conventional Vuilleumier heat pump is provided as set forth hereinbefore. Hence, there are some drawbacks in that, for example, a driving mechanism is required which includes the hot displacer connecting rod 4, the hot crank 5, the cold displacer connecting rod 9, the cold crank 10, the coupling shaft 11 and the like so as to drive the hot displacer and the cold displacer, resulting in a large-sized driving mechanism, and a large-sized crank case 23 involving the driving mechanism.

Further, the hot displacer and the cold displacer are mechanically coupled with each other through the hot displacer connecting rod, the hot crank, the cold displacer connecting rod, the cold crank and the coupling shaft. Accordingly, there are other drawbacks in that, for example, an arrangement of the hot cylinder and the cold cylinder is restricted.

SUMMARY OF THE INVENTION

In view of the foregoing, it is an object of the present invention to provide a Vuilleumier heat pump in which a driving mechanism for driving a hot displacer or a cold displacer has a small-sized and simplified structure, and there is no restriction on an arrangement of a hot cylinder and a cold cylinder.

It is another object of the present invention to provide a Vuilleumier heat pump which can optionally vary operating conditions.

It is a further object of the present invention to provide a Vuilleumier heat pump which can optionally adjust an output.

According to the first aspect of the present invention, for achieving the above-mentioned objects, there is provided a Vuilleumier heat pump including a hot buffer chamber and a cold buffer chamber. The hot buffer chamber is provided adjacent to a hot/moderate temperature space formed in the hot cylinder, and gas having an intermediate pressure of fluctuating pressure of a working gas is sealed in the hot buffer chamber. The cold buffer chamber is provided adjacent to a cold/moderate temperature space formed in the cold cylinder, and gas having the intermediate pressure of the fluctuating pressure of the working gas is sealed in the cold buffer chamber. In one buffer chamber, the one displacer rod is coupled with any one of the hot and cold displacers, and is coupled with a crank through a displacer connecting rod. In the other buffer chamber, the other displacer rod coupled with the other displacer is coupled with a wall of the other buffer chamber through a spring. The pressure fluctuation is generated in the working gas by reciprocation of the one displacer according to the rotation of the crank. A vibration system of the other displacer is provided by force generated at the other displacer rod due to a difference between the pressure of the working gas and gas pressure in the other buffer chamber and by the spring. The hot displacer and the cold displacer can reciprocate with a phase difference of about a right angle.

According to the second aspect of the present invention, there is provided a Vuilleumier heat pump including a linear motor for reciprocating the other displacer rod.

According to the third aspect of the present invention, there is provided a Vuilleumier heat pump in which the one displacer rod is also coupled with an inner wall of the one buffer chamber through the spring as well as the other displacer rod. A vibration system of the one displacer is provided as in the case of the other displacer, and the hot displacer and the cold displacer can reciprocate with the phase difference of about a right angle.

According to the fourth aspect of the present invention, there is provided a Vuilleumier heat pump of the third aspect, further including a linear motor for reciprocating the hot or cold displacer rod.

As stated above, in the Vuilleumier heat pump according to the first aspect of the present invention, the other displacer is coupled with the wall of the other buffer chamber by the spring through the other displacer rod in the other buffer chamber. Further, the vibration system of the other displacer is provided to reciprocate the other displacer by the force generated at the other displacer rod due to the difference between the pressure of the working gas and the gas pressure in the other buffer chamber and by the spring. As a result, unlike the conventional Vuilleumier heat pump, the driving mechanism such as displacer connecting rod, crank or the like is unnecessary, and the mechanism for driving the other displacer can have a small-sized and simplified structure. In addition, one cylinder and the other cylinder are coupled through only the coupling pipe so that no restriction is imposed on the arrangement of the one cylinder and the other cylinder.

Further, the Vuilleumier heat pump according to the second aspect of the present invention includes the linear motor for reciprocating the other displacer rod. As a result, it is possible to optionally vary the operating conditions (an amplitude of the motion of the other displacer and the phase difference), and optionally adjust the output.

In addition, in the Vuilleumier heat pump according to the third aspect of the present invention, the one displacer rod is also coupled with the inner wall of the one buffer chamber by the spring so as to provide the vibration system of the one displacer as in the case of the other displacer. As a result, the mechanism for driving the one displacer can have a small-sized and simplified structure, resulting in a smaller-sized and compact Vuilleumier heat pump.

Furthermore, in the Vuilleumier heat pump according to the fourth aspect of the present invention, both the displacer rods are supported by the springs so as to provide the vibration systems, and the linear motor is provided so as to reciprocate at least one of the displacer rods. As a result, it is possible to optionally vary the operating conditions, and optionally adjust the output.

The above and further objects and novel features of the present invention will more fully appear from the following detailed description when the same is read in connection with the accompanying drawing. It is to be expressly understood, however, that the drawings are for purpose of illustration only and are not intended as a definition of the limits of the invention.

BRIEF DESCRIPTION OF THE DRAWINGS

FIG. 13 is a characteristic diagram showing an output characteristic of the Vuilleumier heat pump according to the present invention;

FIG. 14 is another characteristic diagram showing another output characteristic of the Vuilleumier heat pump according to the present invention;

DETAILED DESCRIPTION OF THE PREFERRED EMBODIMENTS

Figure 1:
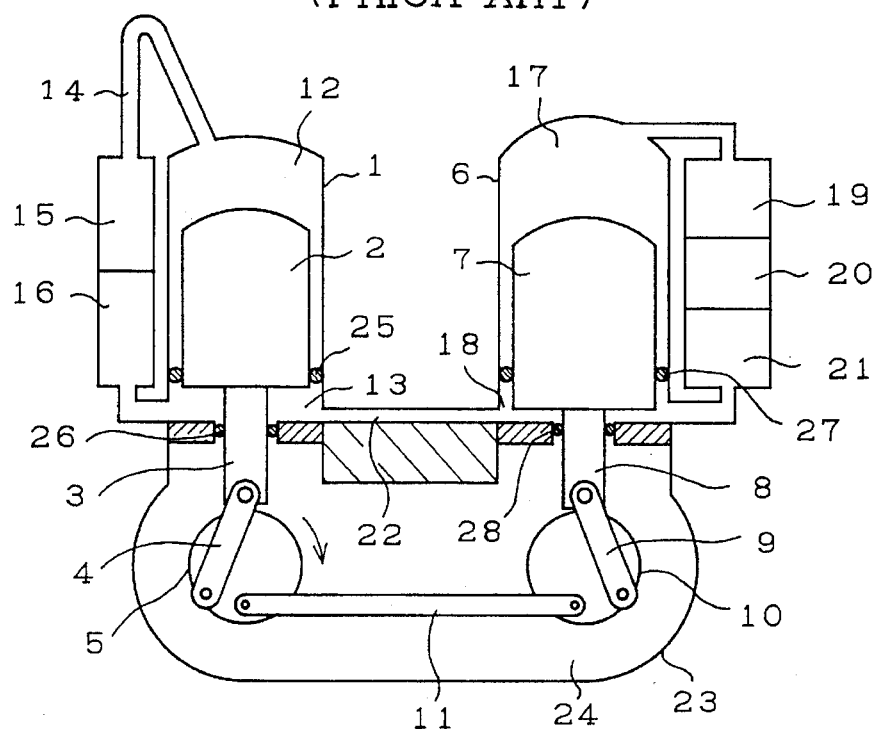
FIG. 1 is a sectional view showing a configuration of a conventional Vuilleumier heat pump.

Preferred embodiments of the invention will now be described in detail referring to the accompanying drawings, in which the component parts common to FIG. 1 are designated by common reference numerals. The descriptions of the common component parts are omitted here to avoid unnecessary repetition.

EMBODIMENT 1

Figure 7:
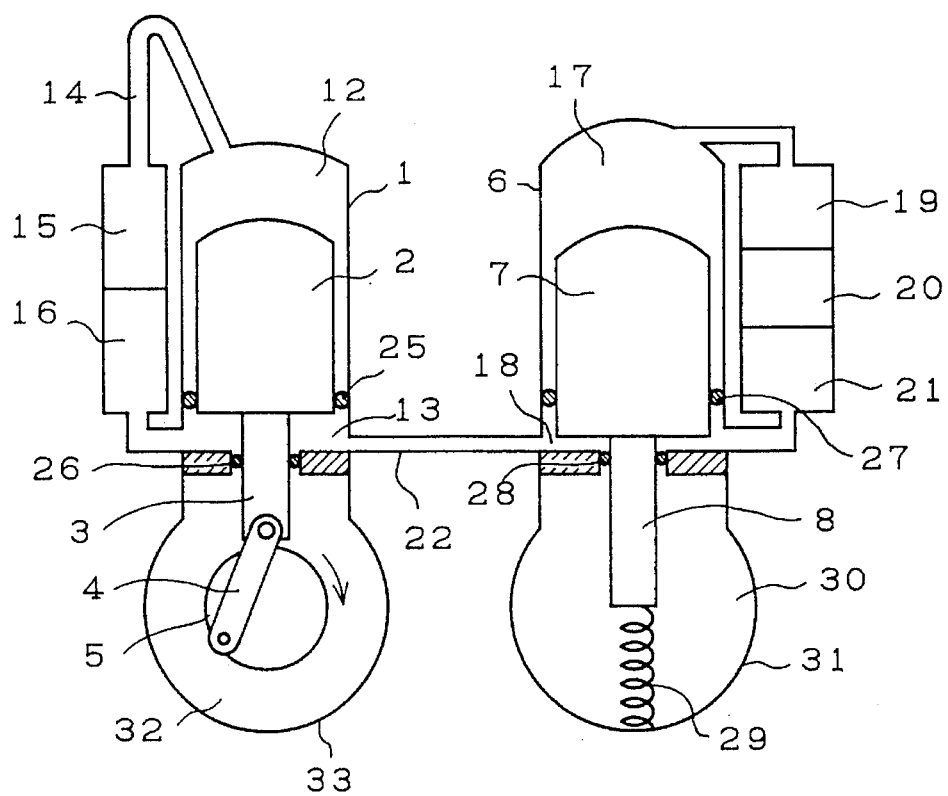
FIG. 7 is a sectional view showing a configuration of a Vuilleumier heat pump according to the embodiment 1 of the present invention.

A description will now be given of one embodiment of a Vuilleumier heat pump of the present invention with reference to the drawings. FIG. 7 is a sectional view showing a configuration of the Vuilleumier heat pump according to the embodiment 1 of the present invention. In FIG. 7, reference numeral 29 means a cold spring (which is a coil spring in this embodiment) coupled with the cold displacer rod 8, and 30 means a cold buffer chamber disposed adjacent to the cold/moderate temperature space 18. Further, reference numeral 31 means a cold buffer case, 32 means a hot buffer chamber disposed adjacent to the hot/moderate temperature space 13, and 33 is a hot buffer case. In FIG. 7, the component parts common to the conventional embodiment (shown in FIG. 1) are designated by common reference numerals, and the descriptions thereof are omitted.

A description will now be given of the operation of the embodiment.

Since the Vuilleumier heat pump is operated so as to generate hot and cold as in the prior art, a description will now be given of the operation of a hot displacer and a cold displacer.

Figure 2:
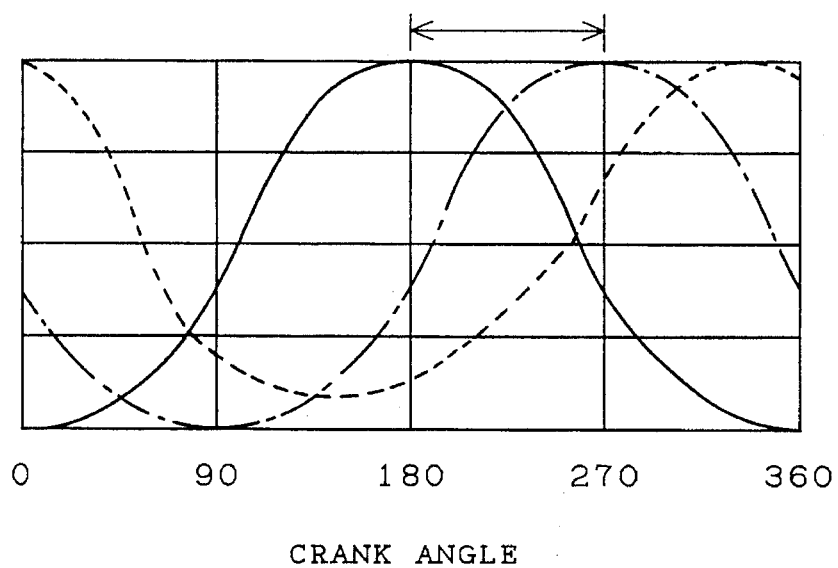
FIG. 2 is a waveform diagram showing motion of a hot displacer and a cold displacer, and a pressure fluctuation of a working gas, illustrating a characteristic of the conventional Vuilleumier heat pump.
Figure 3:
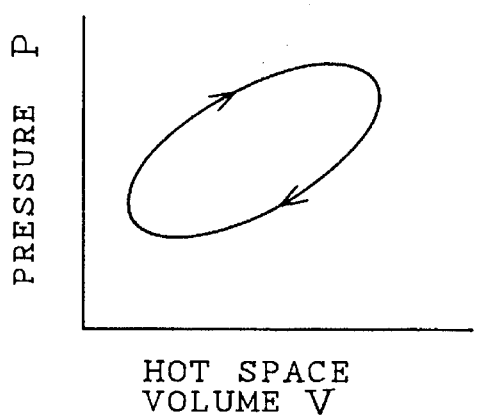
FIG. 3 is a P-V diagram in a hot space, illustrating the characteristic of the conventional Vuilleumier heat pump.
Figure 4:
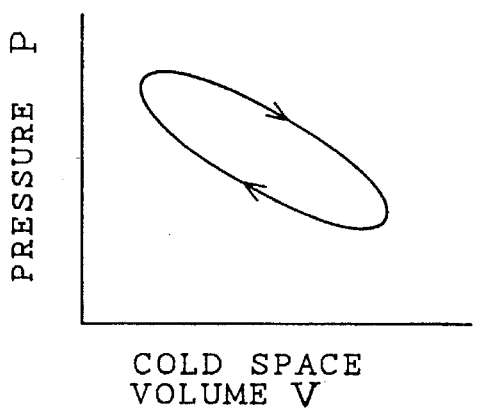
FIG. 4 is a P-V diagram in a cold space, illustrating the characteristic of the conventional Vuilleumier heat pump.
Figure 5:
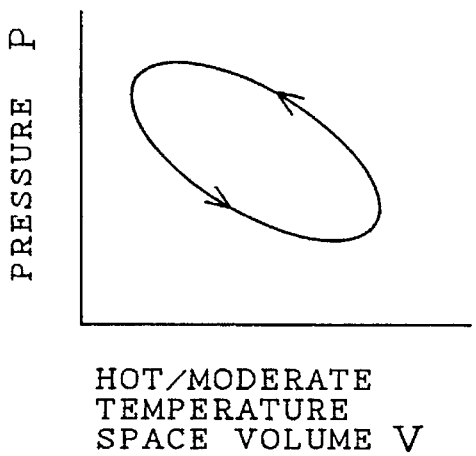
FIG. 5 is a P-V diagram in a hot/moderate temperature space, illustrating the characteristic of the conventional Vuilleumier heat pump.
Figure 6:
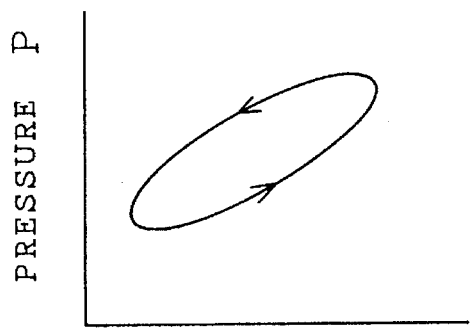
FIG. 6 is a P-V diagram in a cold/moderate temperature space, illustrating the characteristic of the conventional Vuilleumier heat pump.
Figure 8:
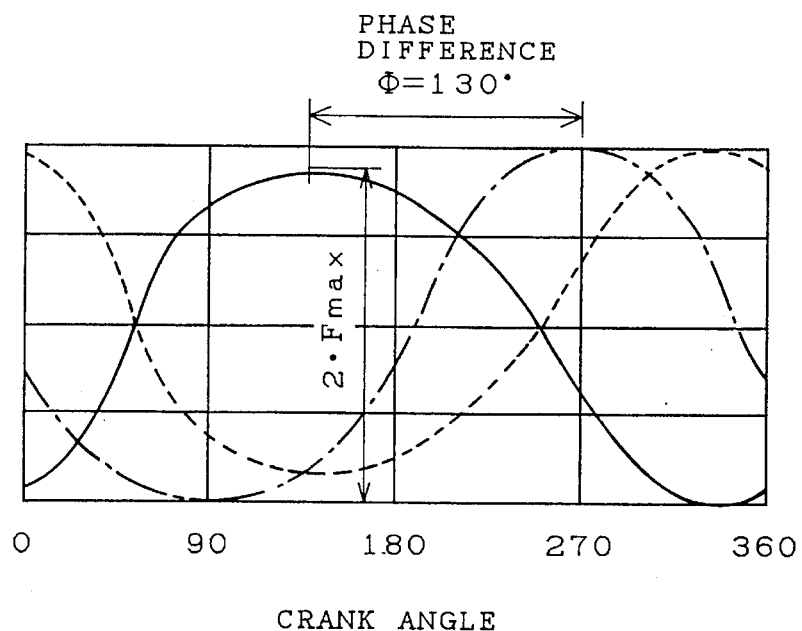
FIG. 8 is a waveform diagram showing motion of a cold displacer, the pressure fluctuation of the working gas, and exciting force applied to the cold displacer, illustrating a characteristic of the Vuilleumier heat pump according to the embodiment 1 of the present invention.
Figure 9:
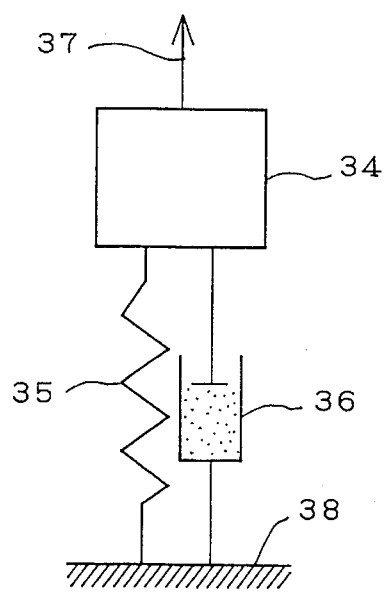
FIG. 9 is a typical explanatory diagram showing a vibration system model, illustrating motion of a displacer according to the present invention.

The hot displacer 2 reciprocates in the hot cylinder 1 by rotating the hot crank 5 by an electric motor (not shown). The motion of the hot displacer 2 causes working gas to alternate between the hot space 12 and the hot/moderate temperature space 13 by passing through the heater 14, the hot regenerator 15, and the hot/moderate temperature heat exchanger 16. At this time, a pressure fluctuation of the gas is generated in a working space due to variation of a ratio of the hot working gas and the cold working gas. Here, it is assumed that there is no pressure loss when the working gas flows into the heat exchanger such as a regenerator. There is a differential pressure between the pressure of the working gas and pressure in the cold buffer chamber 30 so that an exciting force is applied due to the differential pressure to the cold displacer rod 8 coupled with the cold displacer 7. In case the cold buffer chamber 30 has a sufficiently large volume, the pressure in the cold buffer chamber 30 becomes constant, and the exciting force has a phase completely opposed to that of the pressure fluctuation of the working gas. FIG. 8 is a waveform diagram showing the pressure of the working gas, the exciting force applied to the cold displacer 7, and motion of the cold displacer 7 in case the hot displacer 2 and the cold displacer 7 of the Vuilleumier heat pump according to the first embodiment as shown in FIG. 7 move like those in the prior art Vuilleumier heat pump as shown in FIG. 2. In FIG. 8, the pressure of the working gas is shown by the broken wavy line, the exciting force applied to the cold displacer 7 is shown by the solid wavy line, and the motion of the cold displacer 7 is shown by the one dot chain wavy line. In the case of the embodiment 1, the cold displacer 7 is equivalently regarded as a forced vibration system having the first degree of freedom as shown in a typical explanatory view of FIG. 9. In FIG. 9, reference numeral 34 means a mass, 35 means a spring for coupling the mass 34 with a base 38, 36 is an attenuator coupled with the mass 34, and 37 is exciting force applied to the mass 34. The cold displacer 7 and the cold displacer rod 8 shown in FIG. 7 correspond to the mass 34, and the cold coil spring 29 in FIG. 7 corresponds to the spring 35. The exciting force applied to the cold displacer in FIG. 8 corresponds to exciting force 37, and the attenuator 36 in FIG. 9 corresponds to resistance generated by slide friction in the cold displacer seal 27 or the cold displacer rod seal 28 shown in FIG. 7. Natural frequency $\omega_n$ of the cold displacer 7 is expressed by the following expression:

$$\omega_n = \sqrt{\frac{k}{m}} \quad (1)$$

where m: sum of masses of the cold displacer 7 and the cold displacer rod 8 k: spring constant of the cold coil spring 8 c: attenuation coefficient in slide of the cold displacer seal 27 and the cold displacer rod seal 28

Figure 10:
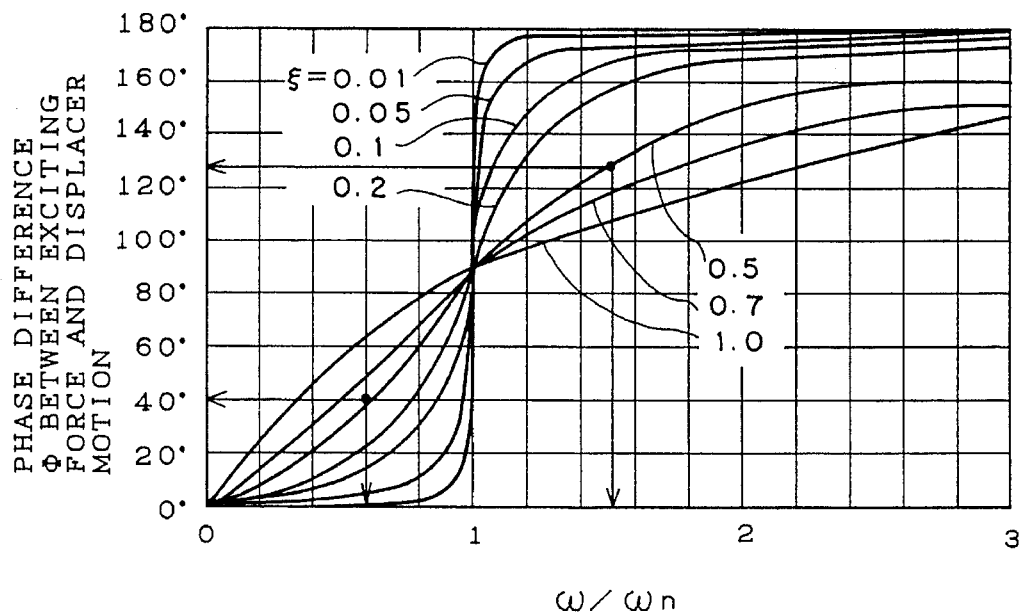
FIG. 10 is a characteristic diagram showing a characteristic of the vibration system model of FIG. 9.

FIG. 10 is a characteristic diagram showing a characteristic of the vibration system as shown in FIG. 9. In FIG. 10, a transverse axis defines an operating frequency $\omega$ to the natural frequency $\omega_n$, and an ordinate axis defines a phase difference $\phi$ between the exciting force applied to the cold displacer 7 and the motion of the cold displacer 7. For example, in case a damping ratio $\xi$ is 0.5, the phase difference $\phi$ becomes 130 degrees when $\omega/\omega_n=1.5$. For example, the natural frequency $\omega_n$ of the cold displacer 7 becomes 10 Hz when m=10 kg, and k=3.95×10$^4$ N/m. If the operating frequency $\omega$ of the Vuilleumier heat pump is assumed to be 15 Hz, the phase difference $\phi$ is 130 degrees, and the Vuilleumier heat pump according to the first embodiment shown in FIG. 7 is operated with the same phase difference $\alpha$ between the hot displacer 2 and the cold displacer 7 as a phase difference of a right angle between the hot displacer 2 and the cold displacer 7 in the conventional Vuilleumier heat pump. The damping ratio $\xi$ is defined by the following expression:

$$\xi = \frac{c}{\sqrt{m \times k}} \quad (2)$$

Figure 11:
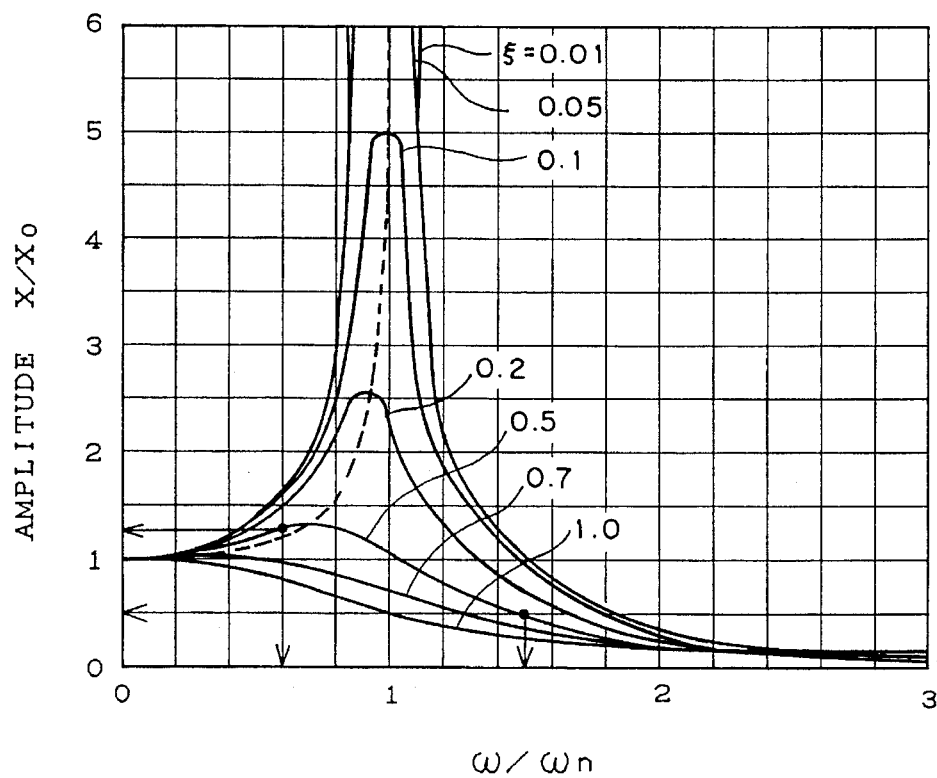
FIG. 11 is another characteristic diagram showing another characteristic of the vibration system model of FIG. 9.

FIG. 11 is a characteristic diagram showing a characteristic of the vibration system as shown in FIG. 9. In FIG. 11, a transverse axis defines the operating frequency $\omega$ to the natural frequency $\omega_n$, and an ordinate axis defines a motion amplitude X of the cold displacer 7 to displacement $X_0$ of the cold displacer 7 when the maximum value $F_{max}$ of the amplitude of the exciting force applied to the cold displacer shown in FIG. 8 is statically applied to the cold displacer 7. If $\xi=0.5$, and $\omega/\omega_n=1.5$, a ratio of amplitude $X/X_0$ becomes 0.5. The static displacement $X_0$ is proportional to the maximum value $F_{max}$ of the amplitude of the exciting force, and the maximum value $F_{max}$ of amplitude of the exciting force is proportional to a sectional area of the cold displacer rod 8. Therefore, the static displacement $X_0$ is proportional to the sectional area of the cold displacer rod 8. As understood from the above description, if the cold displacer rod 8 has an appropriately set diameter, it is possible to operate the cold displacer 7 of the first embodiment with the same amplitude as that in the conventional Vuilleumier heat pump.

Accordingly, in the Vuilleumier heat pump according to the first embodiment as shown in FIG. 7, the hot crank 5 is rotated by the electric motor (not shown) so as to reciprocate the hot displacer 2 in the hot cylinder 1. The cold displacer 7 can reciprocate in the cold cylinder with the same amplitude as that of the conventional Vuilleumier heat pump, and with a delay of a right angle with respect to the hot displacer 2. Thus, it is possible to generate the hot and the cold by the same operation as that in the conventional Vuilleumier heat pump.

As set forth above, in the Vuilleumier heat pump according to the first embodiment 1, the conventional driving mechanism such as displacer connecting rod or crank is not employed to drive the cold displacer. As a result, a mechanism for driving the cold displacer can have a small-sized and simplified structure. Further, the hot cylinder and the cold cylinder can be coupled with each other by only the coupling pipe. Hence, there is no restriction on an arrangement of the hot cylinder and the cold cylinder.

EMBODIMENT 2

Figure 12:
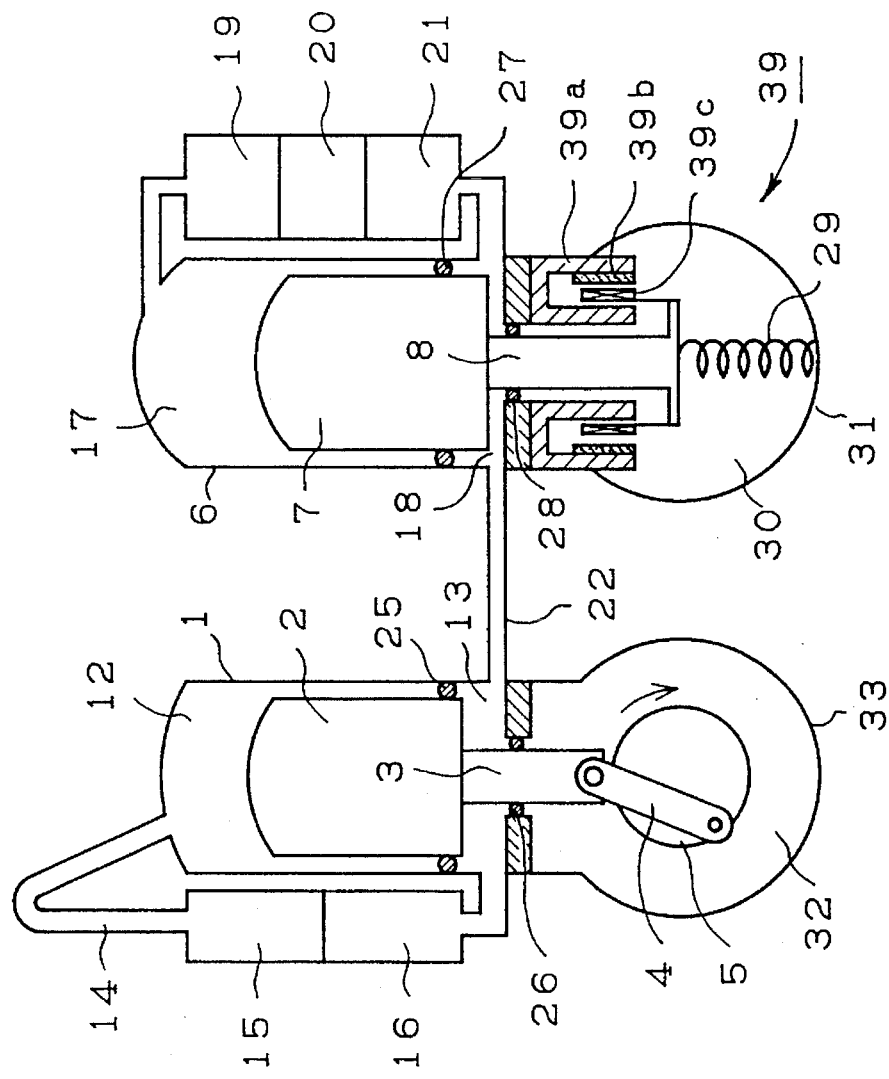
FIG. 12 is a sectional view showing a configuration of the Vuilleumier heat pump according to the embodiment 2 of the present invention.

FIG. 12 is a sectional view showing a configuration of a Vuilleumier heat pump according to the embodiment 2 of the present invention. In FIG. 12, reference numeral 39a means a yoke fixed to the cold buffer case 31, 39b means a permanent magnet which is tightly fixed to the yoke 39a, 39c is a coil fixed to the cold displacer rod 8. The cold linear motor 39 includes the yoke 39a, the permanent magnet 39b, and the coil 39c. In FIG. 12, the component parts common to the conventional embodiment and the first embodiment are designated by common reference numerals, and the descriptions thereof are omitted.

A description will now be given of the operation of the embodiment.

Since the Vuilleumier heat pump is operated so as to generate hot and cold as in the prior art, a description will now be given of the operation of the hot displacer and the cold displacer.

Entirely like the operation of the Vuilleumier heat pump according to the first embodiment, the Vuilleumier heat pump according to the second embodiment is operated in case the cold linear motor 39 is not actuated by cutting off current in the coil 39c.

When actuating the cold linear motor 39 by feeding the current into the coil 39c, it is possible to vary attenuation generated by the exciting force 37 and the attenuator 36 as shown in FIG. 9. Accordingly, it is possible to control the phase difference $\alpha$ between the motion amplitude of the cold displacer 7 and the motion of the hot displacer 2. For example, FIG. 13 is a characteristic diagram showing a cold output (cooling capacity) and a coefficient of performance (hereafter abbreviated as COP) in case the motion amplitude of the cold displacer 7 is varied with the constant motion amplitude of the hot displacer 2 and the constant phase difference $\alpha$ of a right angle. FIG. 14 is a characteristic diagram showing the cold output and the COP in case the phase difference $\alpha$ is varied with the motion amplitude of the hot displacer 2 and the cold displacer 7. In FIGS. 13 and 14, characteristic curves shown by the solid line represent the cold output, and characteristic curves shown by the broken line represent the COP. It is possible to vary the cold output or the like by actuating the cold linear motor 39 so as to vary the motion amplitude of the cold displacer 7 and the phase difference $\alpha$.

In the embodiment, it is possible to provide the same effect as that in the first embodiment. Further, there is another effect in that the operating conditions (the motion amplitude of the cold displacer and the phase difference) can be optionally varied so as to vary the cold output or the like in the embodiment while the operation can be performed under only one operating condition in the first embodiment. Though the operating condition can be varied by varying the frequency in the first embodiment, it is impossible to obtain the optimal condition.

EMBODIMENT 3

Figure 15:
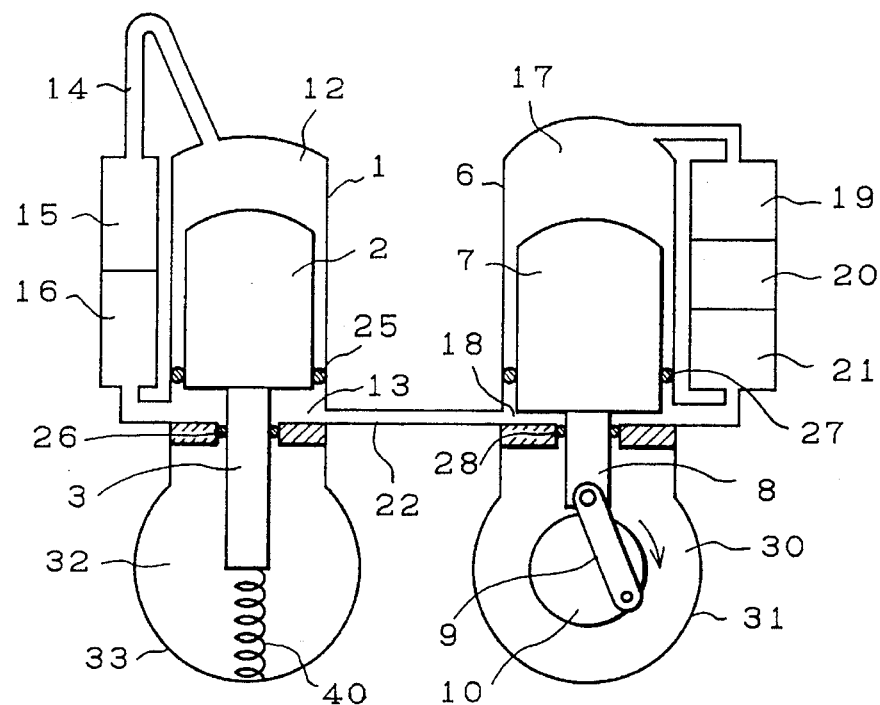
FIG. 15 is a sectional view showing a configuration of the Vuilleumier heat pump according to the embodiment 3 of the present invention.

FIG. 15 is a sectional view showing a configuration of the Vuilleumier heat pump according to the third embodiment of the present invention. In FIG. 15, reference numeral 40 means a hot spring (which is a coil spring in this embodiment) coupled with the hot displacer rod 3. In FIG. 15, the component parts common to the conventional embodiment and the above embodiments are designated by common reference numerals, and the descriptions thereof are omitted.

A description will now be given of the operation of the embodiment.

Since the Vuilleumier heat pump is operated so as to generate the hot and the cold as in the prior art, a description will now be given of the operation of the hot displacer and the cold displacer.

Figure 16:
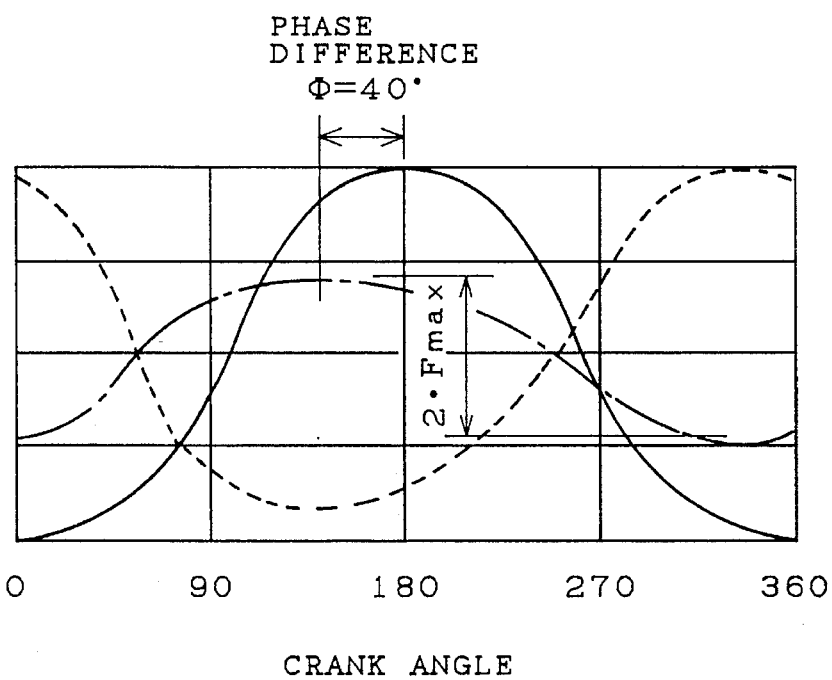
FIG. 16 is a waveform diagram showing the motion of the hot displacer, the pressure fluctuation of the working gas, and the exciting force applied to the hot displacer, illustrating a characteristic of the Vuilleumier heat pump according to the embodiment 3 of the present invention.

The cold displacer 7 reciprocates in the cold cylinder 6 by rotating the cold crank 10 by an electric motor (not shown). The motion of the cold displacer 7 causes working gas to alternate between the cold space 17 and the cold/moderate temperature space 18 by passing through the cold heat exchanger 19, the cold regenerator 20, and the cold/moderate temperature heat exchanger 21. At this time, a pressure fluctuation of gas is generated in a working space due to variation of a ratio of the cold working gas and the moderate temperature working gas. Here, it is assumed that there is no pressure loss when the working gas flows into the heat exchanger such as a regenerator. There is a differential pressure between the pressure of the working gas and pressure in the hot buffer chamber 32 so that exciting force is applied due to the differential pressure to the hot displacer rod 3 coupled with the hot displacer 2. In case the hot buffer chamber 32 has a sufficiently large volume, the pressure in the hot buffer chamber 32 becomes constant, and the exciting force has a phase completely opposed to that of the pressure fluctuation of the working gas. FIG. 16 is a waveform diagram showing the pressure of the working gas, the exciting force applied to the hot displacer 2, and motion of the hot displacer 2 in case the hot displacer 2 and the cold displacer 7 of the Vuilleumier heat pump according to the embodiment 3 as shown in FIG. 15 move like the prior art Vuilleumier heat pump as shown in FIG. 2. In FIG. 16, the pressure of the working gas is shown by the broken wavy line, the exciting force applied to the hot displacer 2 is shown by the one dot chain wavy line, and the motion of the hot displacer 2 is shown by the solid line. In case of the third embodiment, the hot displacer 2 is equivalently regarded as a forced vibration system having the first degree of freedom as shown in FIG. 9 as in the case of the embodiment 1. In FIG. 9, the mass 34 corresponds to the hot displacer 2 and the hot displacer rod 3 shown in FIG. 15, and the spring 35 corresponds to the hot coil spring 40 in FIG. 15. The exciting force applied to the hot displacer in FIG. 16 corresponds to the exciting force 37 in FIG. 9, and the attenuator 36 in FIG. 9 corresponds to resistance generated by slide friction in the hot displacer seal 25 or the hot displacer rod seal 26 in FIG. 15. Natural frequency $\omega_n$ of the hot displacer 2 is expressed by the following expression:

$$\omega_n = \sqrt{\frac{k}{m}} \quad (3)$$

where m: sum of masses of the hot displacer 2 and the hot displacer rod 3 k: spring constant of the hot coil spring 40 c: attenuation coefficient in slide of the hot displacer seal 25 and the hot displacer rod seal 26

In FIG. 10, for example, in case a damping ratio ξ is 0.5, the phase difference φ between the hot displacer 2 and the cold displacer 7 becomes 40 degrees when $\omega/\omega_n=0.6$. For example, the natural frequency $\omega_n$ of the hot displacer 2 becomes 25 Hz when m=10 kg, and k=2.47×10⁵ N/m. If the operating frequency ω of the Vuilleumier heat pump is assumed to be 15 Hz, the phase difference φ is 40 degrees, and the Vuilleumier heat pump according to the third embodiment shown in FIG. 15 is operated with the same phase difference a between the hot displacer 2 and the cold displacer 7 as a phase difference of right angle between the hot displacer 2 and the cold displacer 7 in the conventional Vuilleumier heat pump.

In FIG. 11, if ξ=0.5, and $\omega/\omega_n=0.6$, a ratio of amplitude $X/X_0$ becomes 1.25. The static displacement $X_0$ is proportional to the maximum value $F_{max}$ of the amplitude of the exciting force which is applied to the hot displacer 2, and the maximum value $F_{max}$ of the amplitude of the exciting force is proportional to a sectional area of the hot displacer rod 3. Therefore, the static displacement $X_0$ is proportional to the sectional area of the cold displacer rod 3. As understood from the above description, if the hot displacer rod 3 has an appropriately set diameter, it is possible to operate the hot displacer 2 of the third embodiment with the same amplitude as that in the conventional Vuilleumier heat pump.

Accordingly, in the Vuilleumier heat pump according to the third embodiment as shown in FIG. 15, the cold crank 10 is rotated by the electric motor (not shown) so as to reciprocate the cold displacer 7 in the cold cylinder 6. The hot displacer 2 can reciprocate in the hot cylinder with the same amplitude as that of the conventional Vuilleumier heat pump, and with a lead of right angle with respect to the cold displacer 7. Thus, it is possible to generate the hot and the cold by the same operation as that in the conventional Vuilleumier heat pump. Like the third embodiment, in the Vuilleumier heat pump according to the third embodiment, a mechanism for driving the hot displacer can have a small-sized and simplified structure, and there is no restriction on an arrangement of the hot cylinder and the cold cylinder.

EMBODIMENT 4

Figure 17:
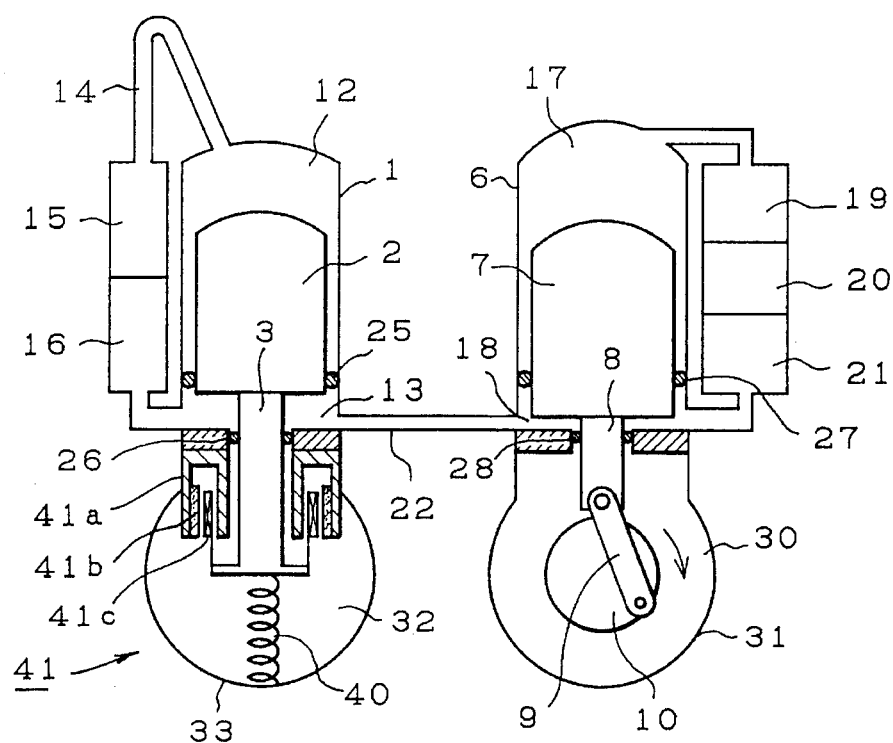
FIG. 17 is a sectional view showing a configuration of the Vuilleumier heat pump according to the embodiment 4 of the present invention.

FIG. 17 is a sectional view showing a configuration of a Vuilleumier heat pump according to the fourth embodiment of the present invention. In FIG. 17, reference numeral 41a means a yoke fixed to the hot buffer case 33, 41b means a permanent magnet which is tightly fixed to the yoke 41a, 41c is a coil fixed to the hot displacer rod 3. The hot linear motor 41 includes the yoke 41a, the permanent magnet 41b, and the coil 41c. In FIG. 17, the component parts common to the conventional embodiment and the above embodiments are designated by common reference numerals, and the descriptions thereof are omitted.

A description will now be given of the operation of the embodiment.

Since the Vuilleumier heat pump is operated so as to generate the hot and the cold as in the prior art, a description will now be given of the operation of the hot displacer and the cold displacer.

Entirely like the operation of the Vuilleumier heat pump according to the third embodiment, the Vuilleumier heat pump according to the fourth embodiment is operated in case the hot linear motor 41 is not actuated by cutting off current in the coil 41c.

When actuating the hot linear motor 41 by feeding the current into the coil 41c, it is possible to vary attenuation generated by the exciting force 37 and the attenuator 36 as shown in FIG. 9. Accordingly, it is possible to control the phase difference α between the motion amplitude of the hot displacer 2 and the motion of the cold displacer 7. For example, FIG. 13 shows the cold output and the coefficient of performance in case the motion amplitude of the cold displacer 7 is varied with the constant motion amplitude of the hot displacer 2 and the constant phase difference α of a right angle. However, the cold and the hot can be also similarly varied in case the motion amplitude of the hot displacer 2 is varied with the constant motion amplitude of the cold displacer 7 and the phase difference α of 90 degrees. It is possible to vary the cold output or the like by actuating the hot linear motor 41 so as to vary the motion amplitude of the hot displacer 2 and the phase difference α.

In the embodiment 4, it is possible to provide an effect in that the operating condition can be optionally varied so as to vary the cold output or the like, as well as the same effect as that in the embodiment 1.

EMBODIMENT 5

Figure 18:
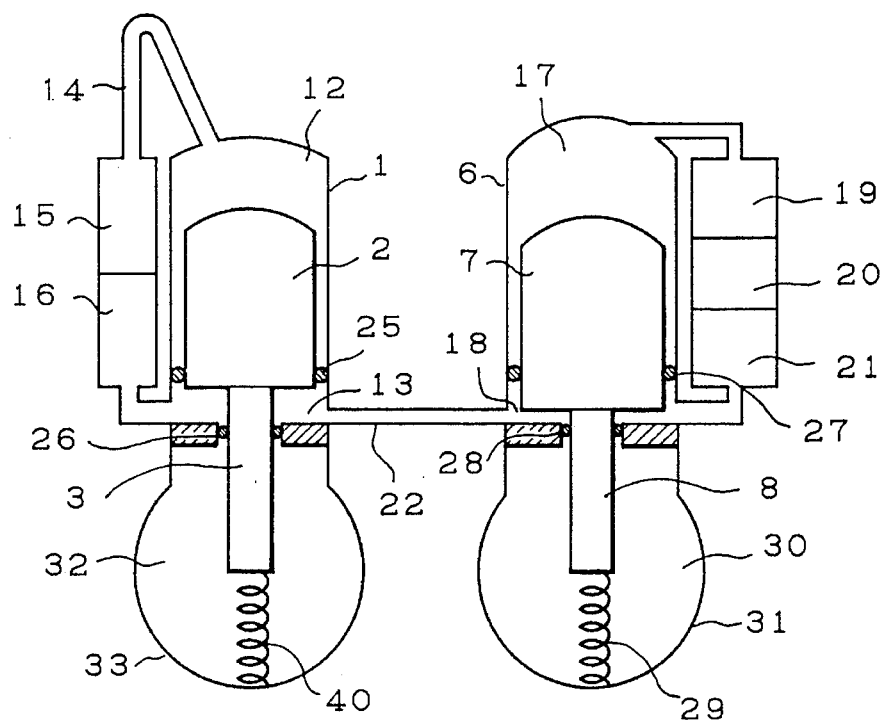
FIG. 18 is a sectional view showing a configuration of the Vuilleumier heat pump according to the embodiment 5 of the present invention.

FIG. 18 is a sectional view showing a configuration of a Vuilleumier heat pump according to the embodiment 5 of the present invention. In FIG. 18, the component parts common to the conventional embodiment and the above embodiments are designated by common reference numerals, and the descriptions thereof are omitted.

Since the Vuilleumier heat pump is operated so as to generate the hot and the cold as in the prior art, a description will now be given of the operation of the hot displacer and the cold displacer.

The hot displacer 2 is vibrated when, for example, the hot cylinder 1 is externally vibrated. At this time, the cold displacer 7 can reciprocate in the cold cylinder 6 in the same operation as that in the embodiment 1. Further, as the cold displacer 7 reciprocates, the hot displacer 2 can also reciprocate in the entirely same operation as that in the embodiment 3. Therefore, if the hot displacer 2 in the Vuilleumier heat pump according to the embodiment 5 is once actuated, the hot displacer 2 and the cold displacer 7 can reciprocate in the cold cylinder with the same amplitude as that of the conventional Vuilleumier heat pump, and with a delay of right angle with respect to the hot displacer 2. Thus, it is possible to generate the hot and the cold by the same operation as that in the conventional Vuilleumier heat pump.

In the Vuilleumier heat pump according to the embodiment 5, the hot and cold displacers are supported by the spring through the respective displacer rods to form a vibration system. Accordingly, unlike the conventional Vuilleumier heat pump, there is not employed a driving mechanism such as the displacer con'rod, the crank, or the motor for rotating the crank in order to drive the displacers. The driving mechanism can have a smaller-sized and simplified structure, and there is no restriction on an arrangement of the hot cylinder and the cold cylinder.

EMBODIMENT 6

Figure 19:
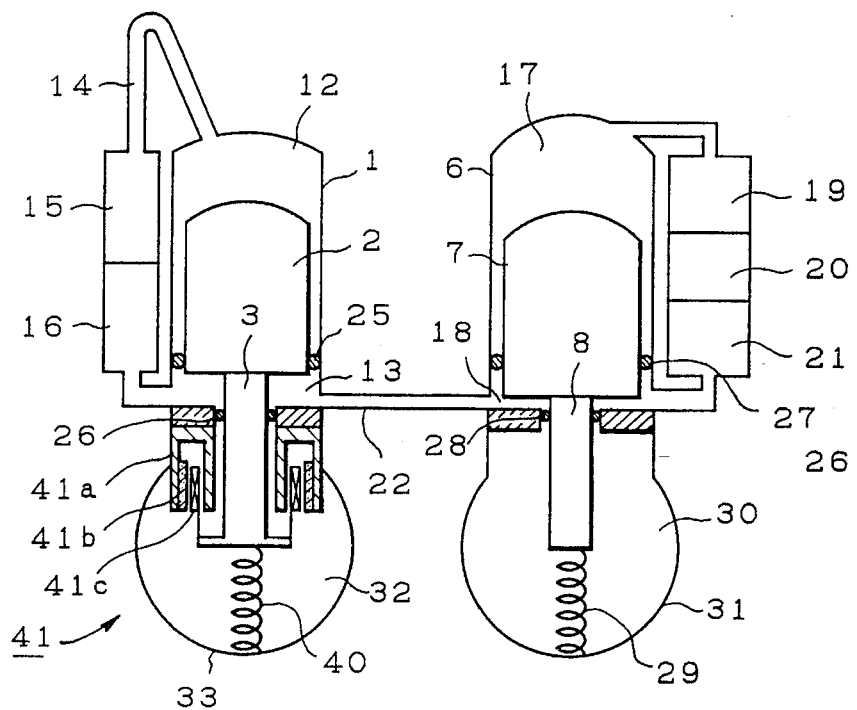
FIG. 19 is a sectional view showing a configuration of the Vuilleumier heat pump according to the embodiment 6 of the present invention.

FIG. 19 is a sectional view showing a configuration of a Vuilleumier heat pump according to the embodiment 6 of the present invention. In FIG. 19, the component parts common to the conventional embodiment and the above embodiments are designated by common reference numerals, and the descriptions thereof are omitted.

A description will now be given of the operation of the embodiment.

Since the Vuilleumier heat pump is operated so as to generate hot and cold as in the prior art, a description will now be given of the operation of the hot displacer and the cold displacer.

Entirely like the operation of the Vuilleumier heat pump according to the embodiment 5, the Vuilleumier heat pump according to the embodiment 6 is operated in case the hot linear motor 41 is not actuated by cutting off current in the coil 41c.

When actuating the hot linear motor 41 by feeding the current into the coil 41c, it is possible to vary attenuation generated by the exciting force 37 and the attenuator 36 as shown in FIG. 9. Accordingly, it is possible to control the phase difference α between the motion amplitude of the hot displacer 2 and the motion of the cold displacer 7. Further, if the motion amplitude of the hot displacer 2 is varied, the pressure amplitude of the working gas is also varied. Accordingly, the exciting force applied to the cold displacer 7 is varied, and the motion amplitude of the cold displacer 7 is also varied. Therefore, it is possible to vary the cold output or the like by actuating the hot linear motor 41 so as to vary the motion amplitude of the hot displacer 2 and the cold displacer 7, and the phase difference α.

In the Vuilleumier heat pump according to the embodiment 6, there is an effect in that the operating condition can be optionally varied so as to adjust the cold output or the like, as well as the same effect as that in the embodiment 5.

EMBODIMENT 7

Figure 20:
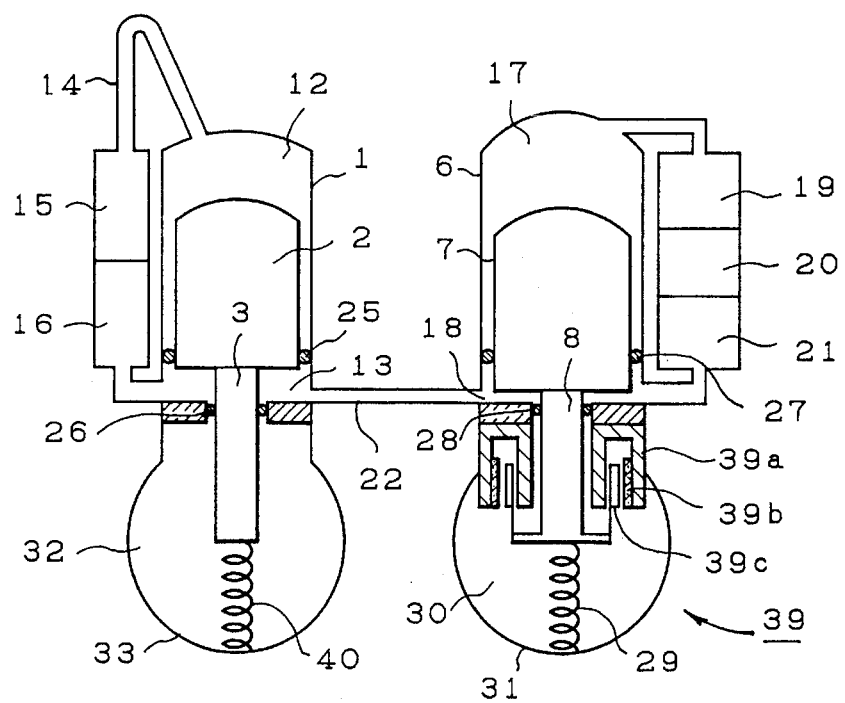
FIG. 20 is a sectional view showing a configuration of the Vuilleumier heat pump according to the embodiment 7 of the present invention.

FIG. 20 is a sectional view showing a configuration of a Vuilleumier heat pump according to the embodiment 7 of the present invention. In FIG. 20, the component parts common to the conventional embodiment and the above embodiments are designated by common reference numerals, and the descriptions thereof are omitted.

A description will now be given of the operation of the embodiment.

Since the Vuilleumier heat pump is operated so as to generate hot and cold as in the prior art, a description will now be given of the operation of the hot displacer and the cold displacer.

Entirely like the operation of the Vuilleumier heat pump according to the embodiment 5, the Vuilleumier heat pump according to the embodiment 7 is operated in case the cold linear motor 39 is not actuated by cutting off current in the coil 39c.

When actuating the cold linear motor 39 by feeding the current into the coil 39c, it is possible to vary attenuation generated by the exciting force 37 and the attenuator 36 as shown in FIG. 9. Accordingly, it is possible to control the phase difference α between the motion amplitude of the cold displacer 7 and the motion of the hot displacer 2. Further, if the motion amplitude of the cold displacer 7 is varied, the pressure amplitude of the working gas is also varied. Accordingly, the exciting force applied to the hot displacer 2 is varied, and the motion amplitude of the hot displacer 2 is also varied. Therefore, it is possible to vary the cold output or the like by actuating the cold linear motor 39 so as to vary the motion amplitude of the cold displacer 7 and the hot displacer 2, and the phase difference α.

In the Vuilleumier heat pump according to the embodiment 7, there is the same effect as that in the embodiment 6.

EMBODIMENT 8

Figure 21:
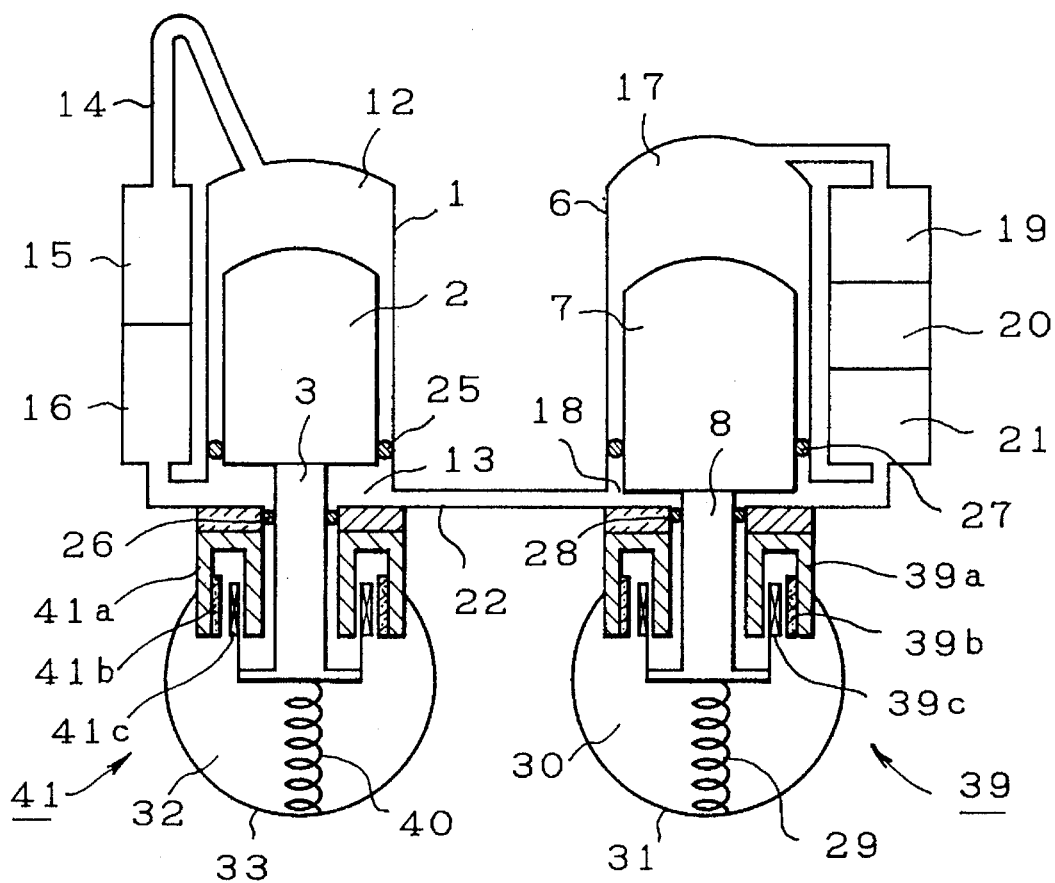
FIG. 21 is a sectional view showing a configuration of the Vuilleumier heat pump according to the embodiment 8 of the present invention.

FIG. 21 is a sectional view showing a configuration of a Vuilleumier heat pump according to the embodiment 8 of the present invention. In FIG. 21, the component parts common to the conventional embodiment and the above embodiments are designated by common reference numerals, and the descriptions thereof are omitted.

A description will now be given of the operation of the embodiment.

Since the Vuilleumier heat pump is operated so as to generate hot and cold as in the prior art, a description will now be given of the operation of the hot displacer and the cold displacer.

Entirely like the operation of the Vuilleumier heat pump according to the embodiment 7, the Vuilleumier heat pump according to the embodiment 8 is operated in case the hot linear motor 41 is not actuated by cutting off the current in the coil 41c.

Entirely like the operation of the Vuilleumier heat pump according to the embodiment 6, the Vuilleumier heat pump according to the embodiment 8 is operated in case the cold linear motor 39 is not actuated by cutting off the current in the coil 39c.

Entirely like the operation of the Vuilleumier heat pump according to the embodiment 5, the Vuilleumier heat pump according to the embodiment 8 is operated in case the cold linear motor 39 and the hot linear motor 41 are not actuated by cutting off the current in the coil 39c and the coil 41c.

When actuating the cold linear motor 39 and the hot linear motor 41 by feeding the current into the coil 39c and the coil 41c, it is possible to control the motion amplitude of the hot displacer 2 and the cold displacer 7, and the phase difference a therebetween. As a result, it is possible to vary the cold output or the like.

In the Vuilleumier heat pump according to the embodiment 8, there are the same effects as those in the embodiments 6 and 7.

EMBODIMENT 9

Figure 22:
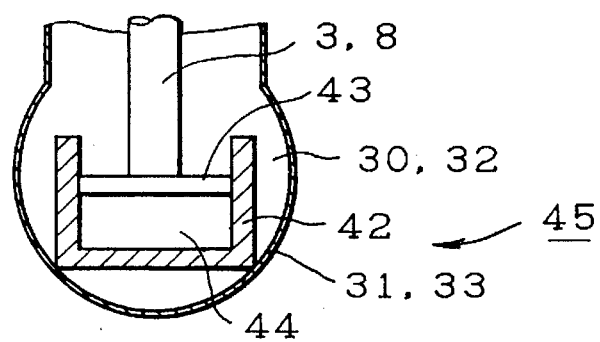
FIG. 22 is a sectional view showing a configuration of a gas spring of the Vuilleumier heat pump according to the embodiment 9 of the present invention.

Though the invention has been described with reference to the embodiments 1 to 8 in which the springs coupled with the displacer rods 3 and 8 are coil springs, a gas spring 45 as shown in a sectional view of FIG. 22 may be employed instead of the coil springs 29, 41 in order to provide the same effect as that in the above embodiments. In FIG. 22, reference numeral 42 means a gas spring case fixed to the buffer case 31 or 33, and 43 means a gas spring piston coupled with the displacer rods 3 and 8 so as to reciprocate in the gas spring case 42. A gas spring chamber 44 is defined by the gas spring case 42 and the gas spring piston 43. Gas having an intermediate pressure of the pressure of the working gas is sealed in the gas spring chamber 44. The gas spring 45 includes the gas spring case 42, the gas spring piston 43, and the gas spring chamber 44.

Since the Vuilleumier heat pump of the present invention is provided as set forth above, there are advantages as described later.

In one buffer chamber, any one of the hot and cold displacer rods is coupled with the crank through the displacer con'rod. In the other buffer chamber, the other displacer rod is coupled with a wall of the other buffer chamber by the spring. The pressure fluctuation is generated in the working gas by the reciprocation of the one displacer according to the rotation of the crank. A vibration system of the other displacer is provided by force generated at the other displacer rod due to a difference between the pressure of the working gas and gas pressure in the other buffer chamber and by the spring. The hot displacer and the cold displacer can reciprocate with a phase difference of about right angle. Hence, for example, the crank for driving the other displacer becomes unnecessary so that the driving mechanism has a small-sized and simplified structure, and no restriction is imposed on the arrangement of the cold cylinder and the hot cylinder.

Further, the linear motor is provided to reciprocate the other displacer rod. As a result, it is possible to optionally vary the operating conditions so as to optionally adjust the output.

In addition, the one displacer rod is also coupled with the inner wall of the one buffer chamber by the spring so as to provide the vibration system of the one displacer as in the case of the other displacer. As a result, the driving mechanism can have a small-sized and simplified structure.

Finally, both the displacer rods are supported by the springs so as to provide the vibration system, and the linear motor is provided to reciprocate at least one of the displacer rods. As a result, the driving mechanism can have a small-sized and simplified structure, and it is possible to optionally vary the operating conditions so as to optionally adjust the output.

While the invention has been described in terms of express embodiments, and alternatives have been suggested, it should be recognized that those skilled in the art may make modifications thereof without departing from the spirit and scope of the invention as defined in the appended claims.

What is claimed is:

1. Vuilleumier heat pump including a hot cylinder, a hot displacer, a cold cylinder, a cold displacer, a heat exchanger and a regenerator, a working gas being sealed in a hot space and a hot/moderate temperature space which are provided in said hot cylinder, a cold space and a cold/moderate temperature space which are provided in said cold cylinder, and a working space which is defined by said heat exchanger and said regenerator, and said hot displacer and said cold displacer reciprocating with a phase difference of about 90 degrees, said Vuilleumier heat pump comprising:

a hot buffer chamber provided adjacent to said hot/moderate temperature space, in which gas having a pressure substantially equal to an intermediate pressure of said working gas is sealed;

a cold buffer chamber provided adjacent to said cold/moderate temperature space, in which gas having a pressure substantially equal to said intermediate pressure of said working gas is sealed;

a first one of said hot and cold displacer rods coupled with a first of said hot and cold displacers being coupled with a crank through a displacer connecting rod in a first of said hot and cold buffer chambers; and a second of said hot and cold displacer rods coupled with a second of said hot said cold displacers being coupled with a wall of a second of said hot and cold buffer chambers through a spring in said second of said hot and cold buffer chambers, wherein said first displacer reciprocates according to rotation of said crank so as to cause a pressure fluctuation of said working gas, a vibration system of said second displacer being provided by force generated at said second displacer rod due to a difference between said pressure of said working gas and a gas pressure in said second buffer chamber and by said spring, and said first and second displacer reciprocating with a phase difference of about 90 degrees.

2. A Vuilleumier heat pump according to claim 1 further comprising:

a linear motor for driving said second displacer rod to reciprocate.

3. A Vuilleumier heat pump including a hot cylinder, a hot displacer, a cold cylinder, a cold displacer, a heat exchanger and a regenerator, a working gas being sealed in a hot space and a hot/moderate temperature space which are provided in said hot cylinder, a cold space and a cold/moderate temperature space which are provided in said cold cylinder, and a working space which is defined by said heat exchanger and said regenerator, and said hot displacer and said cold displacer reciprocating with a phase difference of about 90 degrees, said Vuilleumier heat pump comprising:

a hot buffer chamber provided adjacent to said hot/moderate temperature space, in which gas having a pressure substantially equal to an intermediate pressure of said working gas is sealed;

a cold buffer chamber provided adjacent to said cold/moderate temperature space, in which gas having a pressure substantially equal to said intermediate pressure of said working gas is sealed;

a hot displacer rod coupled with said hot displacer being coupled with a wall of said hot buffer chamber through a first spring in said hot buffer chamber; and a cold displacer rod coupled with said cold displacer being coupled with a wall of said cold buffer chamber through a second spring in said cold buffer chamber, wherein a vibration system of said hot displacer is provided by force generated at said hot displacer rod due to a difference between said pressure of said working gas and a gas pressure in said hot buffer chamber and by said first spring, a vibration system of said cold displacer is provided by force generated at said cold displacer rod due to a difference between said pressure of said working gas a gas pressure in said cold buffer chamber and by said second spring, and said hot displacer and said cold displacer reciprocating with a phase difference of about 90 degrees.

4. A Vuilleumier heat pump according to claim 3 further comprising:

a linear motor for driving at least one of said cold displacer rod and said hot displacer rod to reciprocate.

* * * * *